US012427761B1

(12) United States Patent
Schwab

(10) Patent No.: US 12,427,761 B1
(45) Date of Patent: Sep. 30, 2025

(54) METHOD FOR CREATING A PROOF PRINT IN A WEB-PROCESSING PRINTING PRESS

(71) Applicant: Heidelberger Druckmaschinen AG, Heidelberg (DE)

(72) Inventor: Werner Schwab, Bechtsrieth (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 19/078,545

(22) Filed: Mar. 13, 2025

(30) Foreign Application Priority Data

Mar. 13, 2024 (DE) ..................... 10 2024 107 139.7

(51) Int. Cl.
*B41F 5/20* (2006.01)
*B41F 33/00* (2006.01)
*B65H 19/18* (2006.01)

(52) U.S. Cl.
CPC ............ *B41F 5/20* (2013.01); *B41F 33/0036* (2013.01); *B65H 19/18* (2013.01)

(58) Field of Classification Search
CPC .......... B41F 5/20; B41F 33/0036; B41F 7/18; B65H 19/18
See application file for complete search history.

(56) References Cited

U.S. PATENT DOCUMENTS 10,919,289 B2 2/2021 Schwab
2009/0243204 A1* 10/2009 Breunig ................. B65H 19/12 271/264
2019/0016111 A1* 1/2019 Schwab .............. B41F 23/0409

FOREIGN PATENT DOCUMENTS

DE 102014220361 A1 4/2015
DE 102015213171 B3 1/2017
DE 102017222700 A1 1/2019
DE 102010003385 B4 4/2023
EP 2749414 A1 7/2014
EP 3921164 B1 1/2023

* cited by examiner

*Primary Examiner* — Stephen D Meier
*Assistant Examiner* — Leo T Hinze
(74) *Attorney, Agent, or Firm* — Laurence A. Greenberg; Werner H. Stemer; Ralph E. Locher

(57) ABSTRACT

A method for creating a proof print in a web-processing printing press, for example a rotary printing presses for the industrial printing of packaging, includes using the printing press to print a print job and, thereafter, a follow-up print job and producing the proof print for the follow-up print job. A preferably flying web change from a first web to a second web is carried out, and the proof print is made on an end portion of the first web and preferably upstream of an adhesive join between the two webs or on an edge portion of the first web or of the second web. A proof print is therefore created and, in the process, waste is reduced and the proof print is straightforwardly provided for inspection.

12 Claims, 7 Drawing Sheets

METHOD FOR CREATING A PROOF PRINT IN A WEB-PROCESSING PRINTING PRESS

CROSS-REFERENCE TO RELATED APPLICATION

This application claims the priority, under 35 U.S.C. § 119, of German Patent Application DE 10 2024 107 139.7, filed Mar. 13, 2024; the prior application is herewith incorporated by reference in its entirety.

FIELD AND BACKGROUND OF THE INVENTION

The invention relates to a method for creating a proof print in a web-processing printing press, wherein the printing press prints a print job and, thereafter, a follow-up print job, and the proof print is produced for the follow-up print job.

The invention belongs to the technical field of the graphics industry and, in particular, the area of operating a printing press, preferably a rotary printing press for printing on web-shaped printing material. Specifically, the invention belongs in this case to the sub-field of creating and inspecting a so-called proof print for the purpose of increasing print quality.

DESCRIPTION OF THE RELATED ART

Printing machines for carrying out a flying job change are already known. It is also known to create a proof print. Finally, it is known to use waste for startup printing.

German Patent Application DE 10 2017 222 700 A1, corresponding to U.S. Pat. No. 10,919,289 B2, discloses a web-processing printing press, for example for flexographic printing, having twin printing units (so-called double ink decks (DID)) which can be switched over. The printing press allows a flying job change, the printing units of the twin printing units being activated alternately.

German Patent Application DE 10 2014 220 361 A1 discloses a color-control method, wherein a proof print (a test print or a print which is to be checked for errors prior to the actual printing process) is carried out and measured by using a color-measuring device.

For creating a proof print, the printing press is stopped in order to render the proof print accessible for inspection. That results in production losses and higher production costs.

European Patent EP 3921164 B1 discloses a method which is intended for setting a color profile in a sheet-fed offset printing press and in which pre-printed waste sheets and unprinted good sheets are used during changeover following a job change or during startup printing.

German Patent DE 10 2010 003 385 B4 discloses a method which is intended for carrying out a job change on sheet-fed offset printing presses and in which pre-printed waste sheets and unprinted good sheets are used on an alternating basis during changeover following a job change or during startup printing, wherein, once the final good sheet has been printed, a number of clean-print waste sheets are generated and at least some of the clean-print waste sheets are used as startup waste sheets.

SUMMARY OF THE INVENTION

It is accordingly an object of the invention to provide a method for creating a proof print in a web-processing printing press, which overcomes the hereinafore-mentioned disadvantages of the heretofore-known methods of this general type and which addresses the problem of improving the prior art in such a way as, in particular, to make it possible to create a proof print and, in the process, cut back on waste and straightforwardly provide the proof print for inspection.

Solution According to the Invention for the Problem

With the foregoing and other objects in view there is provided, in accordance with the invention, a method for creating a proof print in a web-processing printing press, wherein the printing press prints a print job and, thereafter, a follow-up print job and the proof print is produced for the follow-up print job, a flying web change from a first web to a second web is carried out, and the proof print is made on an end portion of the first web or on an edge portion of the first web or of the second web.

Advantageous and therefore preferred developments of the invention can be gathered from the dependent claims and also from the description and the drawings.

The end portion of the first web is the final piece of web before the end of the web, e.g. the final 10 meters or 5 meters or 2 meters or a final length which essentially corresponds to the length of the proof print. The edge portion of the first or of the second web is a portion on the side of the web, that is to say on the left or right—as seen in the web-running direction—e.g. a width of less than 33% or 25% or 10% of the width of the web.

The term "proof print" should be understood in this application as follows: the proof print is a test print which, when a printing process is being used, is made on printing material prior to the actual print job and which serves for inspection purposes, in particular by an inspection device, wherein—if necessary—it is possible to ascertain, and then carry out, setting changes for the print job that improve the printing result. The proof print in this application is not a so-called soft proof (it is not just a representation of a screen without any actual printing taking place). The proof print is preferably made by using the print image of the actual print job; as an alternative, it is made by using a proof print image or a proof control strip. For the so-called proofing, it is possible to make for example a color-density measurement and/or to determine the color consistency in respect of special colors in comparison with a given template.

Advantageous Embodiments and Effects of the Invention

The invention advantageously makes it possible to create a proof print and, in the process, cut back on waste and straightforwardly provide the proof print for inspection. The invention is used for example in rotary printing presses for the industrial printing of packaging.

The method according to the invention helps to make it possible for the next print job to be proofed (checked) while printing operation is underway. This is advantageous in particular when use is made of (changing) special colors, because a break in production is advantageously prevented and waste is cut back. Is advantageously the case that, while printing operation is underway, the proof print is accessible for inspection, e.g. on the outside of the finished web roll, where it can be inspected directly or removed for inspection, or for example on an extracted sheet or on an edge portion separated from the sheet.

DEVELOPMENTS OF THE INVENTION

Preferred developments of the invention (developments for short) will be described hereinbelow. Also—unless it is not technically possible—these developments can be combined with one another.

One development can be distinguished in that the change from the print job to the follow-up print job is done on the fly, i.e. without the machine being stopped and preferably without the production speed being reduced. One development can be distinguished in that a flying web change is carried out, wherein the second web is adhesively bonded onto the first web at an adhesive join. Fastenings other than adhesive bonding would also be possible; these are intended to be covered by this term. One development can be distinguished in that the end portion of the first web is located upstream of the adhesive join; preferably directly upstream, i.e. without any other portion with a different print being located therebetween.

One development can be distinguished in that the first web is separated from the second web, preferably by (die) cutting and possibly by additional tearing in the event of initially incomplete separation. One development can be distinguished in that the first web is wound up on a web roll. One development can be distinguished in that the proof print finishes off the web roll, i.e. in particular forms the final or outer layer of the roll. One development can be distinguished in that the proof print is available or accessible for inspection on the web roll; in particular from the outside and in particular without any obstruction from further web layers. The proof print is therefore preferably visible from the outside on the wound-up rolls.

One development can be distinguished in that the first web is separated into sheets, preferably by (die) cutting and possibly by additional tearing in the event of initially incomplete separation. One development can be distinguished by the removal of at least one sheet with the proof print. The removal can preferably be done by automatic extraction. One development can be distinguished in that the removal is done in or downstream of a die cutter. One development can be distinguished in that the removal is done in or downstream of a sheet cutter. The removed sheet is available for inspection. The following procedure is advantageous for proof-print removal at a die cutter: Following the change back from the proof print to the print job, the printing press prints in the same phase position, and therefore in the same register position, as prior to the change from the print job to the proof print, so that die cutting of the print job takes place in register again. This is important in particular when the format of the proof print differs from that of the print job. For proof-print removal at a sheet cutter, it is possible to set the length of the proof print cut from the web.

One development can be distinguished in that the proof print is cut off from the first web. One development can be distinguished in that cutting takes place using a blade or using a laser. One development can be distinguished in that an edge portion of the first web is cut off. The edge portion is preferably located on a longitudinal side of the web. One development can be distinguished in that the edge portion is cut off in arcuate form: a cut is preferably made into the web from one longitudinal side, then cutting continues along the arc (as an alternative: parallel to the longitudinal side) and, finally, the edge portion is cut out in the direction of the same longitudinal side again. The arc can be in the form of a shallow parabola. The edge portion can be separated from the web for example by suction and removed. The edge portion can be provided with a marking on the web, particular on the edge of the web, that is preferably printed on upstream of the edge portion and can be detected in order to identify the position of the edge portion and to activate the cutting tool at the correct moment. The edge portion can be created in principle at any location of the web, i.e. also outside an end portion.

One development can be distinguished in that the print job and the follow-up print job are different from one another, in particular have different print images, e.g. for different packaging items. One development can be distinguished in that at least one printing ink color changes. One development can be distinguished in that a special color changes.

One development can be distinguished in that the proof print is done using at least one printing unit. One development can be distinguished in that the proof print is done using at least four printing units for CMYK printing. One development can be distinguished in that the proof print is done using at least five printing units for CMYK printing and using a special color.

One development can be distinguished in that a value for the length L of the end portion of the first web is predetermined, wherein the proof print is done in the end portion. The predetermining step is preferably done by computer, that is to say by a digital computer and preferably with account being taken of relevant parameters such as for example length of the proof print image and/or production speed (web speed) and/or switchover speed of the printing units and/or duration for the inking up of the printing units/printing formes involved. One development can be distinguished in that: 5 meters$<L<$20 meters, 5 meters$<L<$15 meters or 8 meters$<L<$12 meters or $L=10$ meters.

One development can be distinguished in that the printing units for the follow-up print job that are required for the proof print are activated as the end portion passes by. One development can be distinguished in that corresponding printing units for the print job are deactivated as the end portion passes by. One development can be distinguished in that the printing units for the follow-up print job that are required for the proof print are deactivated as the end portion passes by. One development can be distinguished in that the corresponding printing units for the print job are reactivated as the end portion passes by. Activation and deactivation here mean in particular the engagement and disengagement, respectively, of the plate cylinders and an impression cylinder (or transfer cylinder) involved. The activation and deactivation can be respectively achieved directly upstream and directly downstream of the beginning or the end of the end portion.

One development can be distinguished in that the printing press is a flexographic printing press or a gravure printing press. One development can be distinguished in that the printing press includes a reel changer for flying reel change. One development can be distinguished in that the printing press includes at least one double printing unit which can be switched over, and preferably has a central impression cylinder. One development can be distinguished in that the printing press includes an inline flatbed die cutter. One development can be distinguished in that the printing press includes an inline sheet cutter.

One development can be distinguished in that the proof print is done while production operation of the printing press is underway. One development can be distinguished in that the proof print is inspected using an inspection device, preferably an optical device. One development can be distinguished in that the inspection is done during production operation of the printing press.

The features and combinations of features disclosed in the above sections entitled Field, Invention and Developments and also in the following section entitled Detailed Description represent—in any desired combination with one another—advantageous developments of the invention.

Other features which are considered as characteristic for the invention are set forth in the appended claims.

Although the invention is illustrated and described herein as embodied in a method for creating a proof print in a web-processing printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now in detail to FIGS. 1-7 of the drawings, there are seen preferred exemplary embodiments of the invention and the developments thereof, in which corresponding features are provided with the same reference signs.

Figure 1:
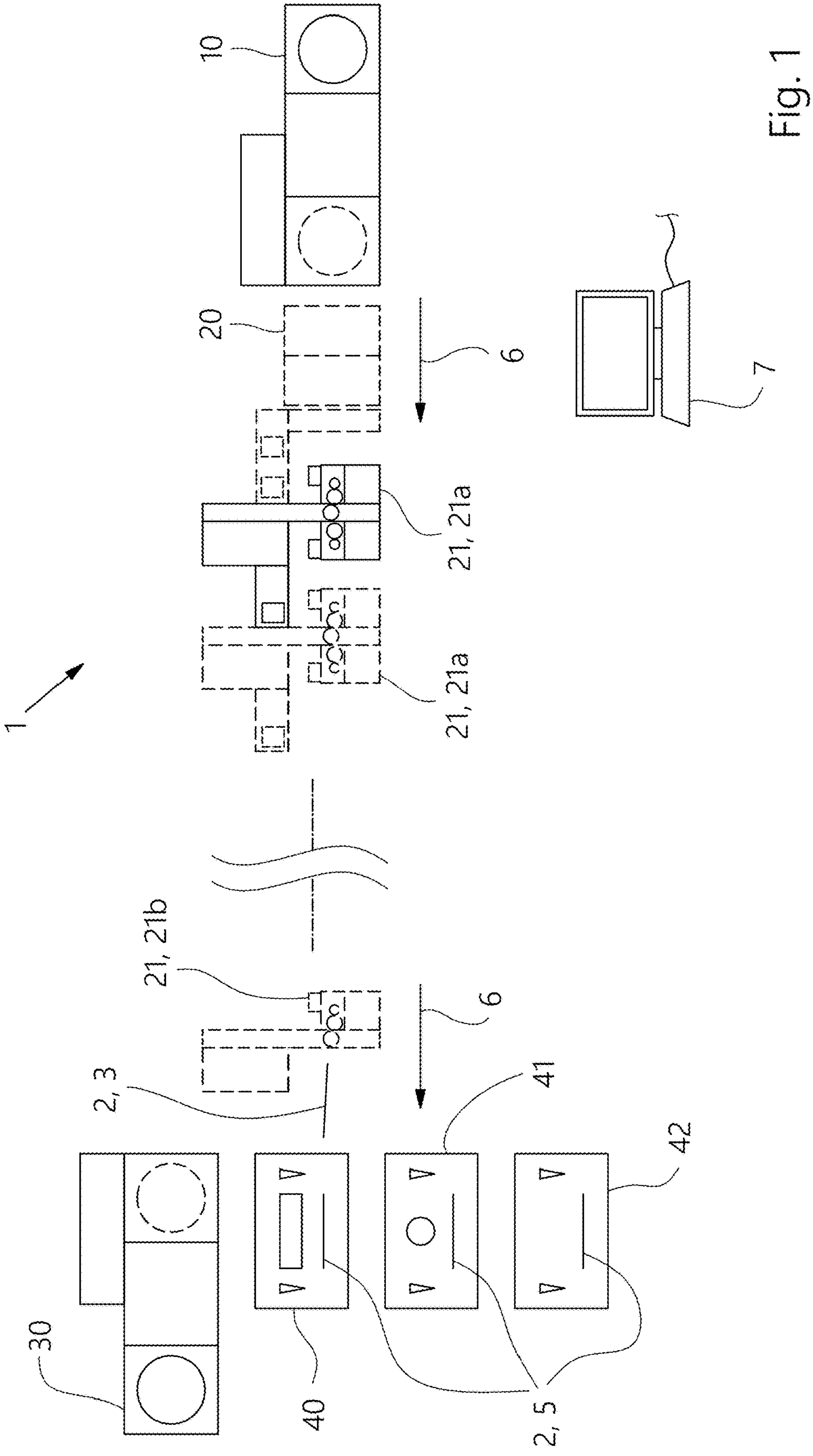
FIG. 1 is a diagrammatic view of a production installation in the course of implementing a preferred exemplary embodiment of the method according to the invention.

The production installation illustrated in FIG. 1 includes a printing press 1, for example a flexographic printing machine for printing packaging, which is intended for processing printing material 2 in the form of a first web 3*a* and/or a subsequent, second web 3*b* (and possibly further subsequent webs) and possibly sheets 5 cut transversely from the respective web. The two webs 3*a* and 3*b* fed to the printing press 1 are joined together or spliced at an adhesive join 4 (see FIG. 2). The printing press 1 processes the webs basically in a production direction 6. The production installation further includes a control computer 7 for controlling the web advancement and the printing operation and also possible further-processing operations. The printing press 1 also includes a sensor 8 for sensing the adhesive join 4 or the presence thereof as it is transported past the sensor (see FIG. 3).

The production installation further includes an unwinder 10, i.e. a reel changer (splicer) for flying reel change, and also an infeed unit 20, in particular for controlling the web tensioning, as well as a printing unit 21—preferably more than one printing unit 21—in particular in the form of a double printing unit 21*a*, and optionally a single printing unit 21*b*. The printing units are for example flexographic printing units.

The production installation additionally includes a rewinder 30 for the webs and/or a flatbed die cutter 40 and/or a rotary die cutter 41 and/or a sheet cutter 42. Preferably just one of the aforementioned units is present or a number of units are present, but just one of the number of units is active.

Figure 2:
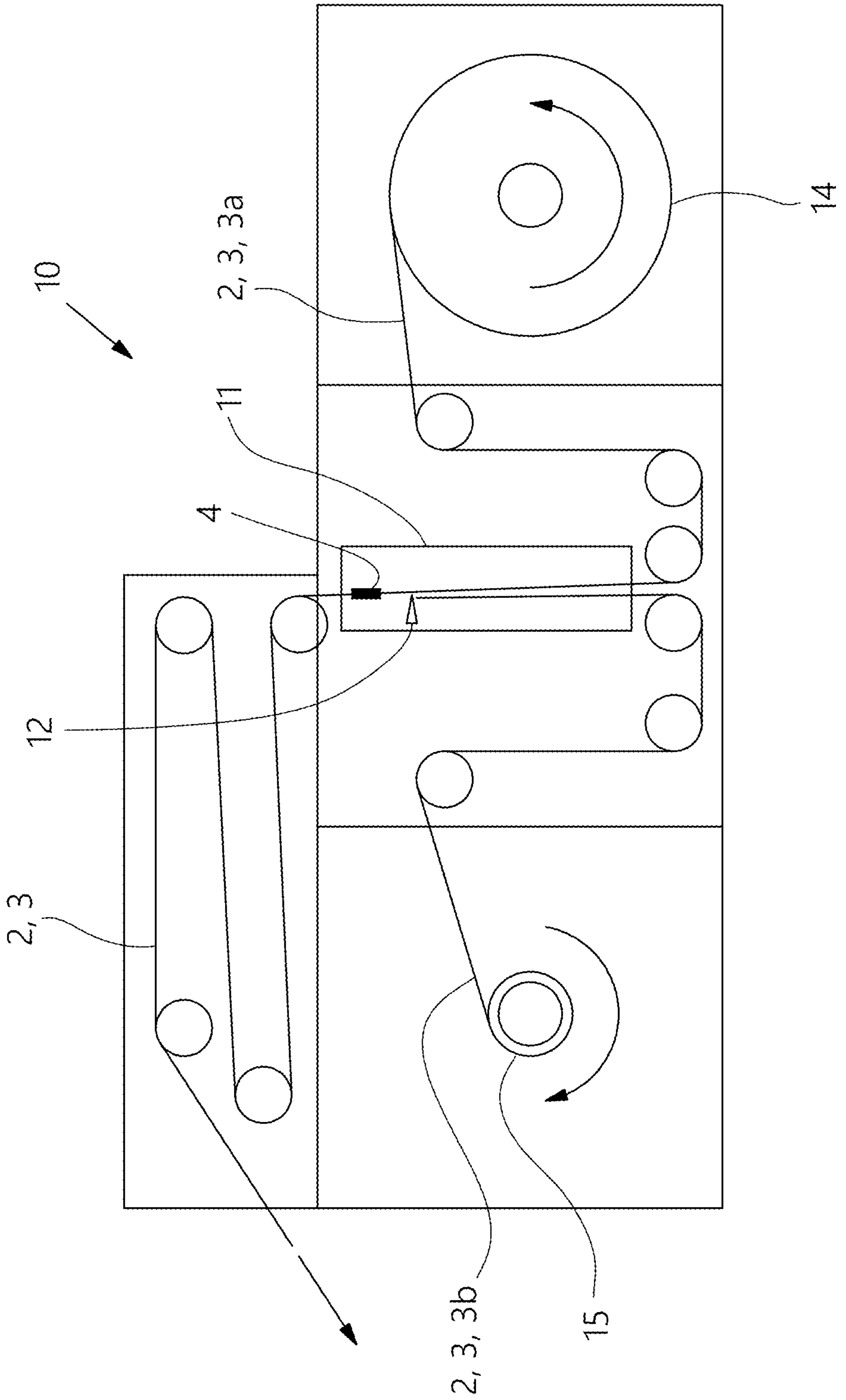
FIG. 2 is a diagrammatic, sectional view of an unwinder or reel changer of the production installation.

The unwinder for two webs 3*a* and 3*b*—and/or including a first web roll 14 and a second web roll 15—that is shown in FIG. 2 has a splicing device 11, which joins together the two webs at the adhesive join 4, for example using a double-sided adhesive tape, and severs the dwindling web using a separating blade 12 downstream of the adhesive join 4. A flying web change is possible in this way.

Figure 3:
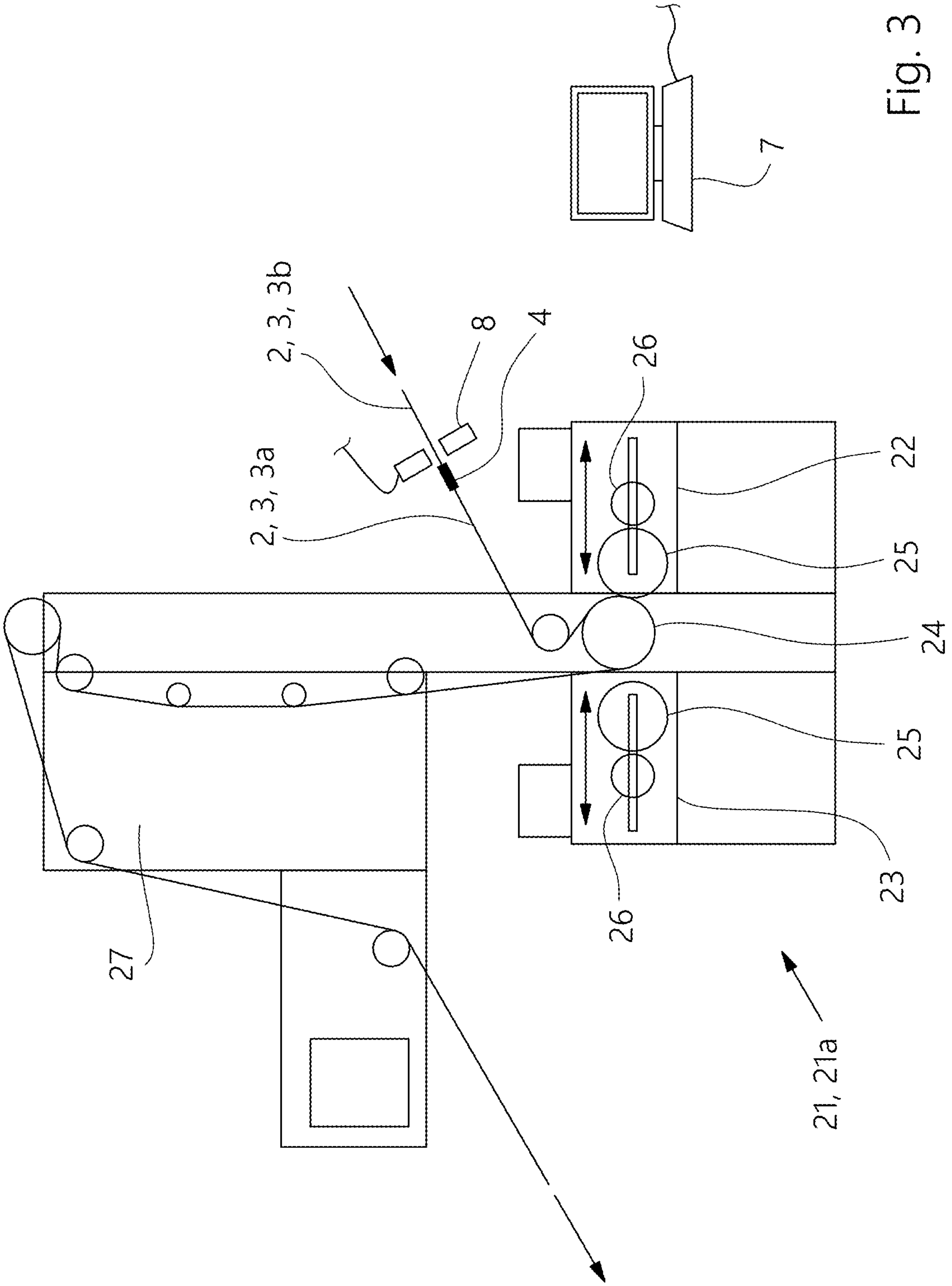
FIGS. 3 and 4 are diagrammatic, sectional views of a double printing unit of the production installation.
Figure 4:
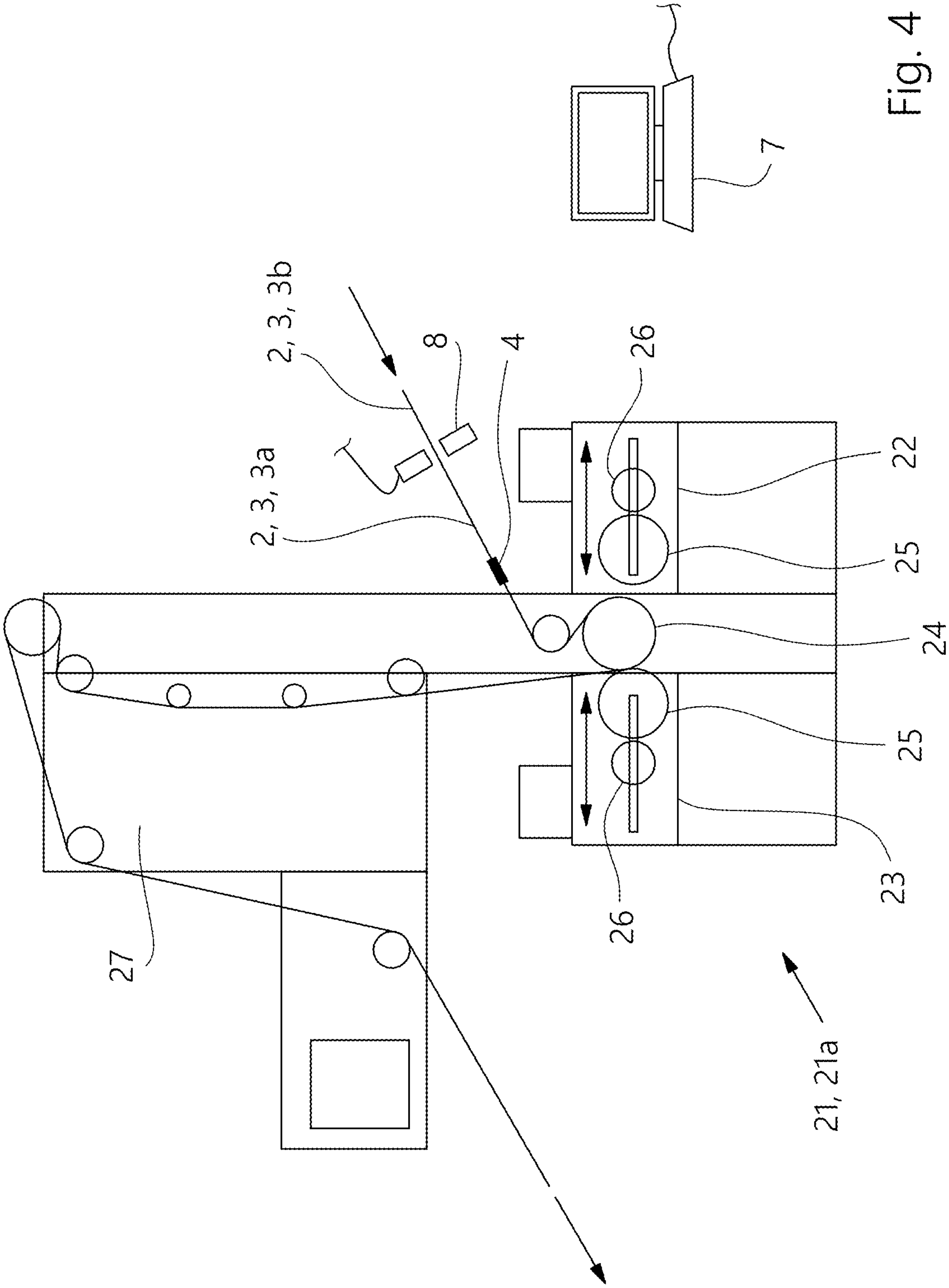

It can be seen by comparing FIGS. 3 and 4 how the switchover between two printing sub-units 22 and 23 of the double printing unit 21*a* is done. The first printing sub-unit 22 prints the print job and the second printing sub-unit 23 prints (temporarily) the proof print 52 and subsequently the follow-up print job 51. The sensor 8, which is disposed in the region of the path of the web upstream of a double printing unit 21*a*, detects the passing adhesive join 4 and a control computer 7, to which the sensor 8 is connected, can then calculate when the adhesive join 4 or an end portion 54 of the first web 3*a* (see FIG. 7) will reach the double printing unit 21*a*. The distance between the sensor 8 and the double printing unit 21*a* can be greater than that illustrated. As soon as, or just before, the end portion 54 reaches the nip of the double printing unit 21*a*, a cylinder 25, in particular a flexographic plate cylinder, is disengaged from the central impression cylinder 24 and, at the same time, the other cylinder 25 is engaged. This achieves a flying change at the start of the end portion 54. A flying change at the end of the end portion, or downstream of the adhesive join 4, is done in the same way. Accordingly, in the region of the end portion 54, the second printing sub-unit 23 has been activated and the first printing sub-unit 22 has been deactivated.

Figure 5:
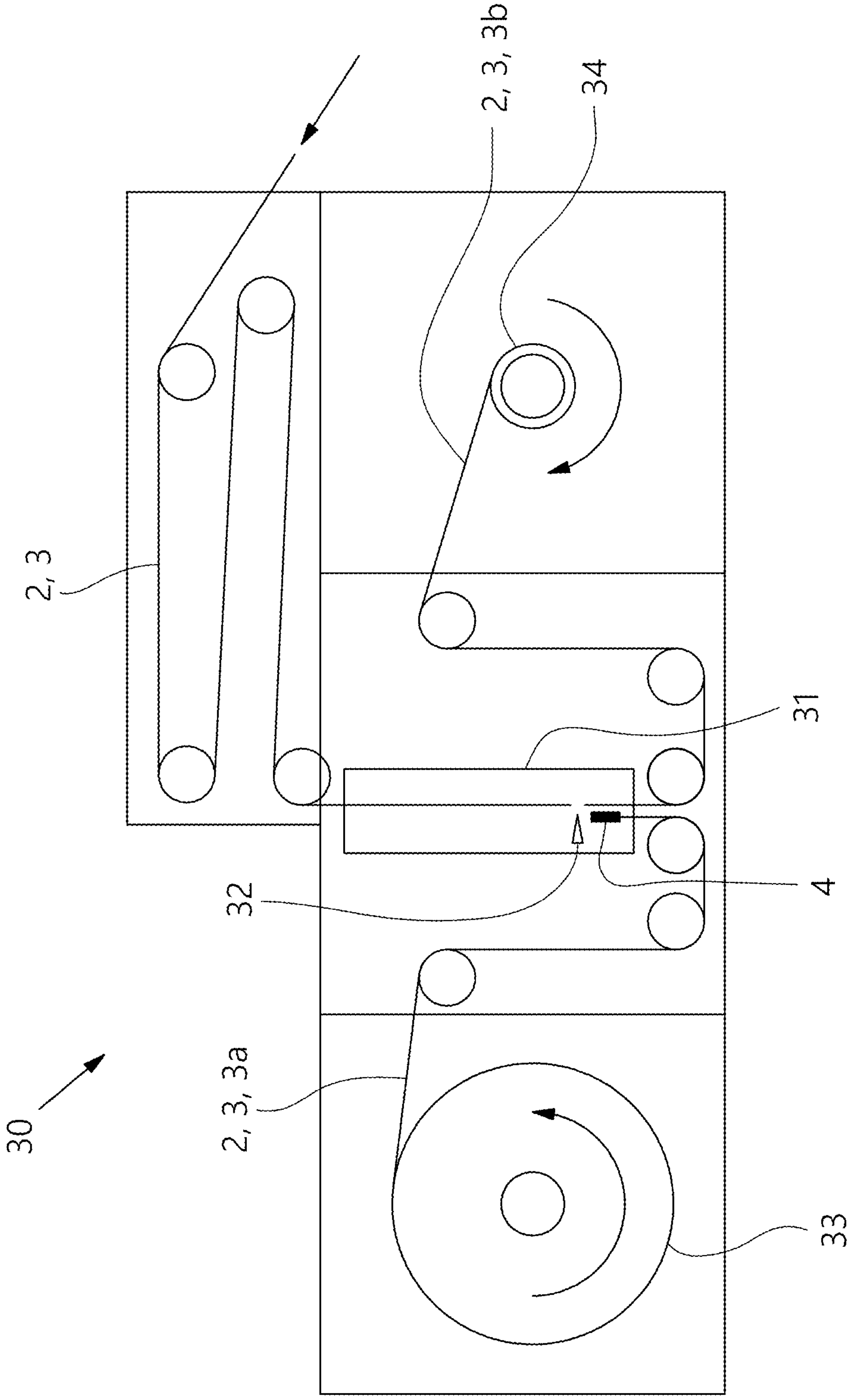
FIGS. 5 and 6 are diagrammatic, sectional views of a rewinder of the production installation.
Figure 6:
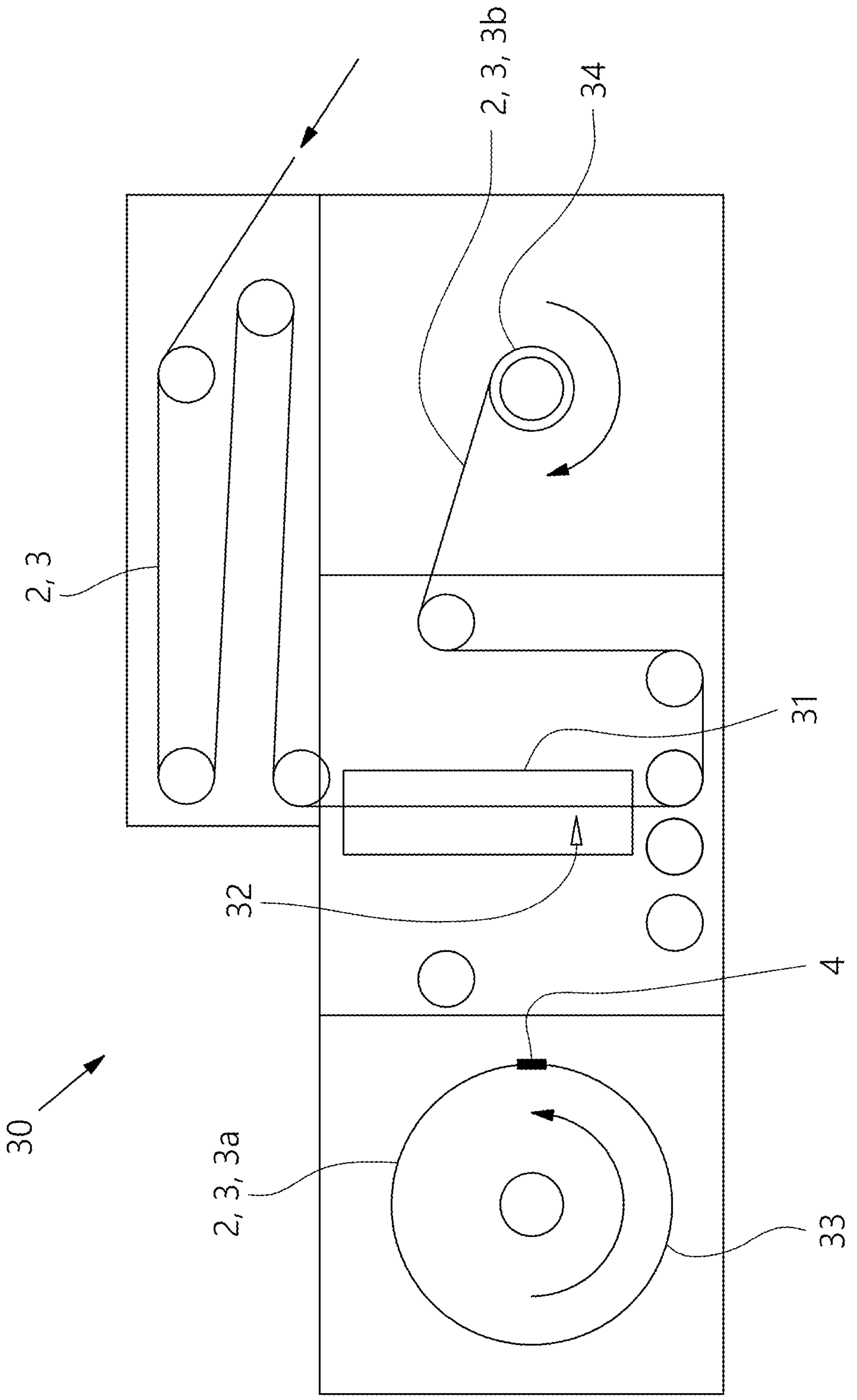

The rewinder for the webs 3*a* and 3*b* that is shown in FIGS. 5 and 6 includes a first web roll 33 and a second web roll 34 and also a separating device 31 having a separating blade 32 for separating the two webs joined together at the adhesive join 4. The first web 3*a*, including the end portion 54 and the adhesive join 4, is wound up onto the first web roll 33, wherein the end portion 54 ends up located on the outside and is therefore accessible for direct inspection or to operating staff. The second web 3*b* is then wound up onto the second web roll 34.

Figure 7:
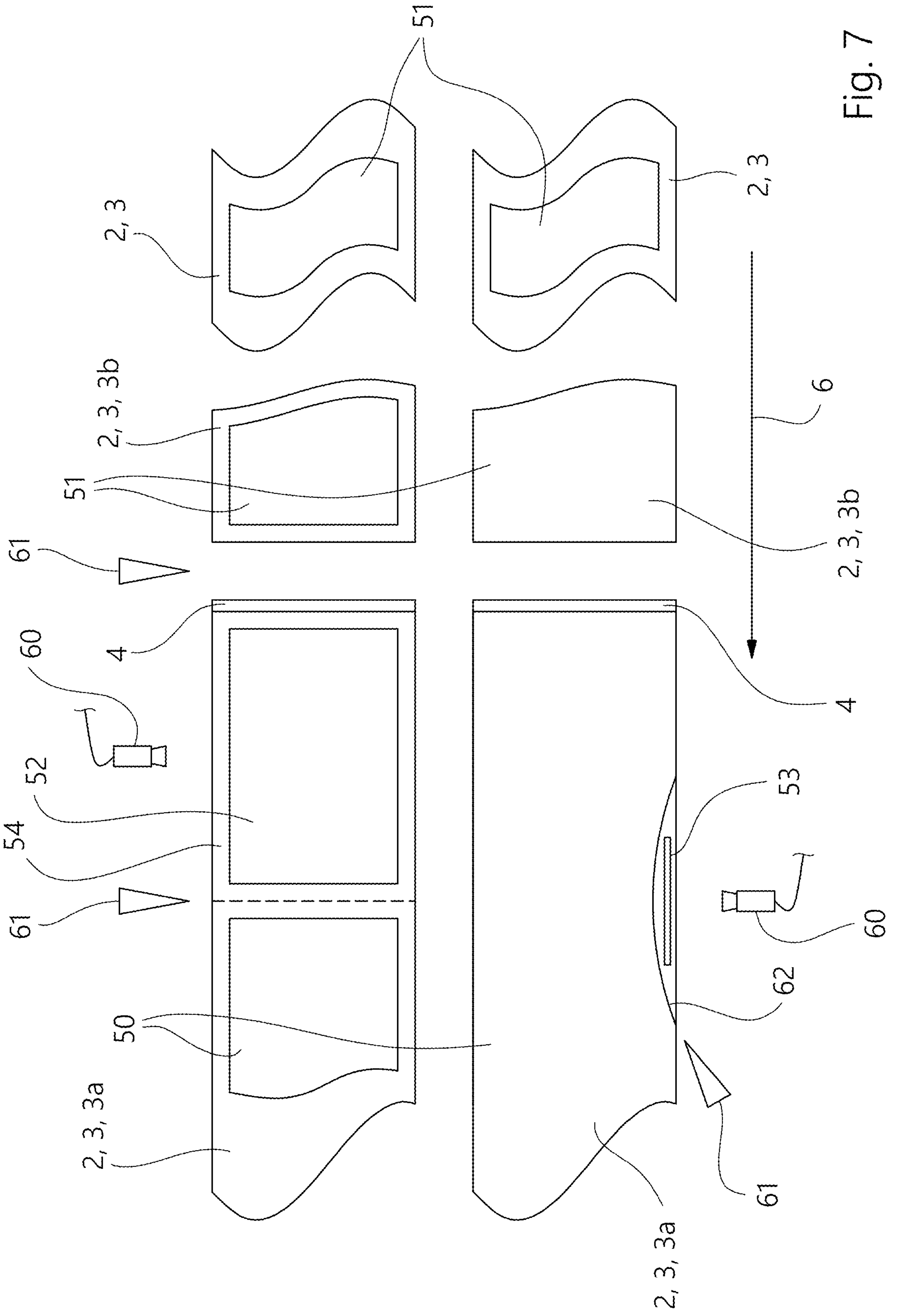
FIG. 7 is a diagrammatic, plan view of a first and a second web.

FIG. 7 shows, in the upper region, a first web 3*a* and a second web 3*b*. The two webs were connected to one another at an adhesive join 4 and have been separated from one another by a separating device 31. The print job 50 is respectively printed on the first web 3*a* and on the second web 3*b*. In addition, the proof print 52 is printed on the end portion 54 of the first web 3*a*. The follow-up print job 51 is printed on the second web 3*b* or on a further web. The end portion can be completely severed from the first web, e.g. using a cutting device 61 or in a die-cutting device 40, 41 or in a sheet cutter 42.

In the lower region, FIG. 7 shows a different solution, namely a proof control strip 53, which is printed only in an edge portion 62 of the first web 3*a* and which is cut out of the web in arcuate form by using a cutting device 61, e.g. using a laser.

The proof print 52 and the proof control strip 53 can each be inspected by an inspection device 60, for example a camera. This can be done inline, i.e. in the machine, or offline, once the respective print 52, 53 has been removed.

The following is a summary list of reference numerals and the corresponding structure used in the above description of the invention:

1 printing press
2 printing material
3 web
3*a* first web
3*b* second web
4 adhesive join
5 sheet
6 production direction
7 control computer
8 sensor for adhesive join
10 unwinder, reel changer
11 splicing device
12 separating blade
14 first web roll (unwinder)
15 second web roll (unwinder)
20 infeed unit
21 printing unit(s)
21*a* double printing unit(s)
21*b* single printing unit(s)
22 first printing sub-unit
23 second printing sub-unit
24 impression cylinder
25 plate cylinder, in particular flexographic plate cylinder
26 anilox roller
27 dryer
30 rewinder
31 separating device
32 separating blade
33 first web roll (rewinder)
34 second web roll (rewinder)
40 flatbed die cutter
41 rotary die cutter
42 sheet cutter
50 print job
51 follow-up print job
52 proof print
53 proof control strip
54 end portion
60 inspection device, inspection
61 cutting device, in particular blade or a laser
62 edge portion

The invention claimed is:

1. A method for creating a proof print in a web-processing printing press, wherein the printing press (1) prints a print job (50) and, thereafter, a follow-up print job (51) and the proof print (52) is carried out for the follow-up print job (51), characterized in that a web change from a first web (3*a*) to a second web (3*b*) is carried out, and in that the proof print (52) is made on an end portion (54) of the first web (3*a*) or on an edge portion (62) of the first web (3*a*) or of the second web (3*b*).

2. The method as claimed in claim 1, characterized in that a flying web change is carried out, wherein the second web (3*b*) is adhesively bonded onto the first web (3*a*) at an adhesive join (4).

3. The method as claimed in claim 2, characterized in that the end portion (54) of the first web (3*a*) is located upstream of the adhesive join (4).

4. The method as claimed in one of the preceding claims, characterized in that the first web (3*a*) is wound up on a web roll (33).

5. The method as claimed in claim 4, characterized in that the proof print (52) finishes off the web roll (33).

6. The method as claimed in claim 5, characterized in that the proof print (52) is accessible for inspection (60) on the web roll (33).

7. The method as claimed in one of preceding claims 1 to 3, characterized in that the first web (3*a*) is separated into sheets (5).

8. The method as claimed in claim 7, characterized by the removal of at least one sheet (5) with the proof print (52).

9. The method as claimed in one of preceding claims 1 to 3, characterized in that the proof print (52) is cut off from the first web (3*a*).

10. The method as claimed in claim 9, characterized in that the edge portion (62) of the first web (3*a*) is cut off.

11. The method as claimed in one of the preceding claims, characterized in that the printing units (22) for the follow-up print job (51) that are required for the proof print (52) are activated as the end portion (54) passes by.

12. The method as claimed in claim 11, characterized in that corresponding printing units (21) for the print job (50) are deactivated as the end portion (54) passes by.

* * * * *